US012562495B2

(12) United States Patent
Lin et al.

(10) Patent No.: US 12,562,495 B2
(45) Date of Patent: Feb. 24, 2026

(54) ANTENNA ASSEMBLY

(71) Applicant: KYOCERA AVX Components (San Diego), Inc., San Diego, CA (US)

(72) Inventors: Weichun Eric Lin, San Diego, CA (US); Jon Eu Lyu, Irvine, CA (US); Manjurul Ahsan Riheen, Santee, CA (US); Shigeaki Kinori, Shiga (JP)

(73) Assignee: KYOCERA AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 18/659,665

(22) Filed: May 9, 2024

(65) Prior Publication Data

US 2025/0087892 A1 Mar. 13, 2025

Related U.S. Application Data

(60) Provisional application No. 63/581,506, filed on Sep. 8, 2023.

(51) Int. Cl.
*H01Q 13/20* (2006.01)
*H01Q 13/02* (2006.01)

(52) U.S. Cl.
CPC ......... *H01Q 13/20* (2013.01); *H01Q 13/0233* (2013.01)

(58) Field of Classification Search
None
See application file for complete search history.

(56) References Cited

U.S. PATENT DOCUMENTS

| | | | |
|---|---|---|---|
| 7,372,412 | B2 | 5/2008 | Koide |
| 7,429,952 | B2 | 9/2008 | Sun |
| 7,545,029 | B2 | 6/2009 | Wilson et al. |
| 7,683,837 | B2 | 3/2010 | Noro |
| 7,714,785 | B2 | 5/2010 | Hsu et al. |
| 7,825,860 | B2 | 11/2010 | Ying |
| 8,044,871 | B2 | 10/2011 | Takisawa et al. |

(Continued)

FOREIGN PATENT DOCUMENTS

| | | | |
|---|---|---|---|
| CN | 210628489 | U * | 5/2020 |
| CN | 115275578 | A | 11/2022 |

(Continued)

OTHER PUBLICATIONS digikey.com, "P522304, 9000154 Datasheet by Kyocera AVX", Nov. 27, 2018, https://www.digikey.com/en/htmldatasheets/production/753120/0/0/1/p522304-datasheet, retrieved on May 9, 2024, 8 pages.

(Continued)

*Primary Examiner* — Crystal L Hammond
(74) *Attorney, Agent, or Firm* — Dority & Manning, P.A.

(57) ABSTRACT

An antenna assembly is provided. The antenna assembly includes a ceramic carrier having a first surface and a second surface, the second surface being opposite the first surface. The antenna assembly further includes an antenna pattern. The antenna pattern includes a first antenna portion positioned at least partially on the first surface of the ceramic carrier. The antenna pattern further includes a second antenna portion comprising a plurality of conductive vias extending through the ceramic carrier from the first antenna portion to the second surface of the ceramic carrier.

19 Claims, 8 Drawing Sheets

(56) References Cited

U.S. PATENT DOCUMENTS

| | | | |
|---|---|---|---|
| 8,174,455 B2 | 5/2012 | Miyoshi et al. | |
| 8,179,322 B2 | 5/2012 | Nissinen | |
| 8,797,222 B2 | 8/2014 | Chamseddine | |
| 9,325,071 B2 | 4/2016 | Fasenfest | |
| 9,653,808 B2 | 5/2017 | Hwang et al. | |
| 9,799,958 B2 | 10/2017 | Sampo et al. | |
| 10,020,560 B1 | 7/2018 | Chou et al. | |
| 10,374,314 B2 | 8/2019 | Iino | |
| 10,381,733 B2 | 8/2019 | Hwang et al. | |
| 10,439,266 B2 | 10/2019 | Hwang et al. | |
| 10,916,836 B2 | 2/2021 | Thiam et al. | |
| 10,923,823 B2 | 2/2021 | Hwang et al. | |
| 11,005,166 B2 | 5/2021 | Hwang et al. | |
| 11,005,182 B2 | 5/2021 | Kowaita et al. | |
| 11,309,631 B2 | 4/2022 | Iino | |
| 11,670,871 B2 | 6/2023 | Lim et al. | |
| 2008/0165063 A1* | 7/2008 | Schlub | H01Q 1/521 343/702 |
| 2010/0171679 A1 | 7/2010 | Ohshima | |
| 2011/0260928 A1 | 10/2011 | Ito et al. | |
| 2020/0243977 A1* | 7/2020 | Shamblin | H01Q 9/0414 |
| 2020/0373261 A1* | 11/2020 | Marin | H01L 21/288 |
| 2022/0190464 A1 | 6/2022 | Gavagnin et al. | |
| 2022/0311142 A1 | 9/2022 | Hwang et al. | |
| 2022/0328967 A1 | 10/2022 | Kaufmann | |
| 2023/0299487 A1 | 9/2023 | Hwang | |
| 2024/0047879 A1 | 2/2024 | Nozaki et al. | |
| 2024/0072444 A1 | 2/2024 | Hwang | |

FOREIGN PATENT DOCUMENTS

| | | | |
|---|---|---|---|
| CN | 115939751 | A | 4/2023 |
| JP | 2001267834 | A | 9/2001 |
| KR | 100979746 | B1 | 9/2010 |
| WO | WO2007136182 | A1 | 11/2007 |
| WO | WO2021056171 | A1 | 4/2021 |
| WO | WO2022181295 | A1 | 9/2022 |
| WO | WO2022181576 | | 9/2022 |
| WO | WO2022239768 | A1 | 11/2022 |
| WO | WO2023026790 | A1 | 3/2023 |

OTHER PUBLICATIONS

Supplemental Statement from Applicant dated May 9, 2024.

PCT App. No. PCT/US2024/031354; International Search Report and Written Opinion, mailed Sep. 12, 2024, 10 pages.

* cited by examiner

ANTENNA ASSEMBLY

PRIORITY CLAIM

The present application is based on and claims priority to U.S. Provisional Application 63/581,506 having a filing date of Sep. 8, 2023, which is incorporated by reference herein.

FIELD

The present disclosure relates generally to an antenna assembly.

BACKGROUND

Antennas can be used to facilitate wireless communication between devices. It can be desirable for antennas to operate with a high antenna radiation efficiency to improve wireless communication between devices. Antennas may need to be incorporated into a variety of different types of devices to provide for wireless communication, such as satellite communication.

SUMMARY

Aspects and advantages of embodiments of the present disclosure will be set forth in part in the following description, or may be learned from the description, or may be learned through practice of the embodiments.

One example aspect of the present disclosure is directed to an antenna assembly. The antenna assembly includes a ceramic carrier having a first surface and a second surface, the second surface being opposite the first surface. The antenna assembly further includes an antenna pattern. The antenna pattern includes a first antenna portion positioned at least partially on the first surface of the ceramic carrier. The antenna pattern further includes a second antenna portion comprising a plurality of conductive vias extending through the ceramic carrier from the first antenna portion to the second surface of the ceramic carrier.

Another example aspect of the present disclosure is directed to a communication device. The communication device includes an antenna. The antenna includes a first antenna portion positioned at least partially on a first surface of a ceramic carrier. The antenna further includes a second antenna portion comprising a plurality of conductive vias extending through the ceramic carrier from the first antenna portion to a second surface of the ceramic carrier. The second surface of the ceramic carrier is opposite the first surface of the ceramic carrier.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
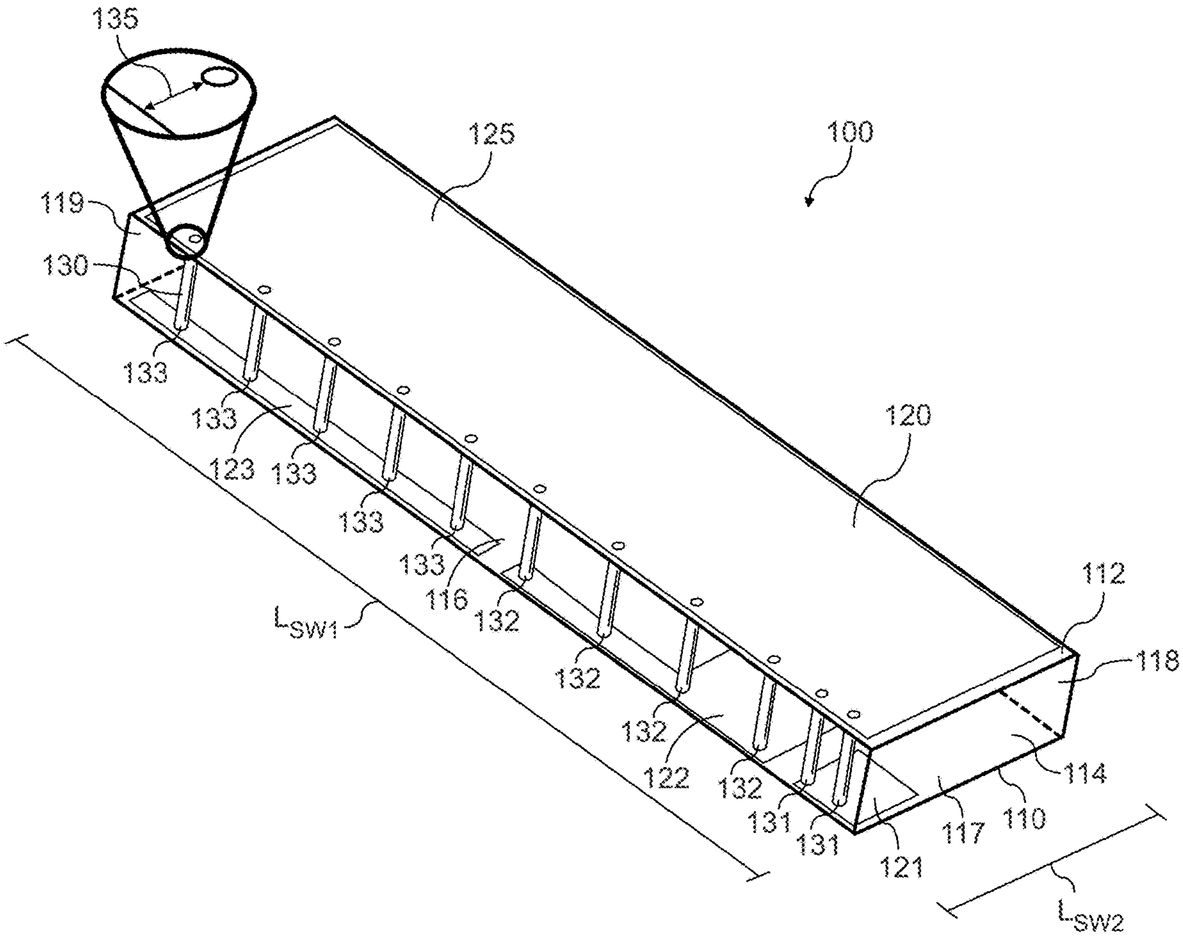
FIG. 1 depicts a perspective view of an example antenna assembly according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations. As used herein, the use of the term “about” in conjunction with a numerical value is intended to refer to within 10% of the numerical value.

Example aspects of the present disclosure provide a technique to simplify the ceramic antenna manufacturing process and cost reduction. Traditionally, to fabricate the ceramic antenna, metal plating may be done on a ceramic dielectric carrier. Sometimes a vertical metal sidewall is included in ceramic antenna design to achieve a desired radiation performance at a certain frequency band. The mass production of this type of ceramic antenna with vertical metal walls is complicated and expensive as it may require multiple steps of metal plating. The manufacturing process of such antennas can be simplified and cost can be reduced significantly by replacing the vertical metal wall with multiple VIAs. The VIAs couple the top and bottom metals of the carrier similar to the vertical metal wall. Moreover, the antenna radiation performance is not impacted by VIA replacement.

Example aspects of the present disclosure are directed to antenna assemblies for use in, for instance, a wide variety of applications. The antenna assemblies may include an antenna (e.g., a Laser Direct Structuring (LDS) antenna) on a carrier (e.g., dielectric carrier, such as a ceramic carrier). The antenna assemblies may be configured to communicate over a variety of different frequency bands/protocols. For instance, the antenna assemblies may be configured to communicate, for instance, over frequency bands associated with LTE, Bluetooth, WiFi, GPS, or GNSS systems and/or protocols.

In some ceramic antenna designs, vertical metal sidewalls may be included to achieve a desired radiation performance at a certain frequency band. Production of this type of ceramic antenna with vertical metal sidewalls may require multiple steps of metal plating. According to example aspects of the present disclosure, multiple vias may be used in the place of vertical metal sidewalls to achieve a similar radiation performance at a certain frequency while reducing manufacturing costs of such antennas.

FIG. 1 depicts an example antenna assembly 100 according to example embodiments of the present disclosure. Those of ordinary skill in the art, using the disclosures provided herein will understand that antenna assembly 100 may include any suitable type of antenna with any operating frequency band. For example, antenna assembly 100 may include a GPS antenna (e.g., GPS ceramic antenna), such as a GPS L1 antenna with an operating frequency of about 1575 MHz or a GPS L5 antenna with an operating frequency of about 1176 MHz. As such, antenna assembly 100 may include a GPS antenna that operates at an L1 frequency band (e.g., about 1575 MHz) or at an L5 frequency band (e.g., about 1176 MHz).

Antenna assembly 100 includes a carrier 110 (e.g., dielectric carrier). In some embodiments, carrier 110 may be a ceramic carrier. Carrier 110 has a first surface 112 and a second surface 114. The first surface 112 is opposite second surface 114. Carrier 110 also includes a plurality of sidewalls 116, 117, 118, and 119 connecting first surface 112 to second surface 114. Carrier sidewalls 116, 117, 118, and 119 may be defined as bare sidewalls, such that no metal structure is positioned on the sidewalls 116, 117, 118, and 119. Sidewalls 116 and 118 have length $L_{SW1}$. Sidewalls 117 and 119 have length $L_{SW2}$. In some examples, $L_{SW1}$ is greater than $L_{SW2}$. For example, carrier sidewalls 116, 118 may have a length ($L_{SW1}$) of about 32 mm and carrier sidewalls 117, 119 may have a length ($L_{SW2}$) of about 9 mm. As shown, carrier sidewalls 116, 118 may be greater in length than adjacent sidewalls 117, 119 of carrier 110.

Figure 2:
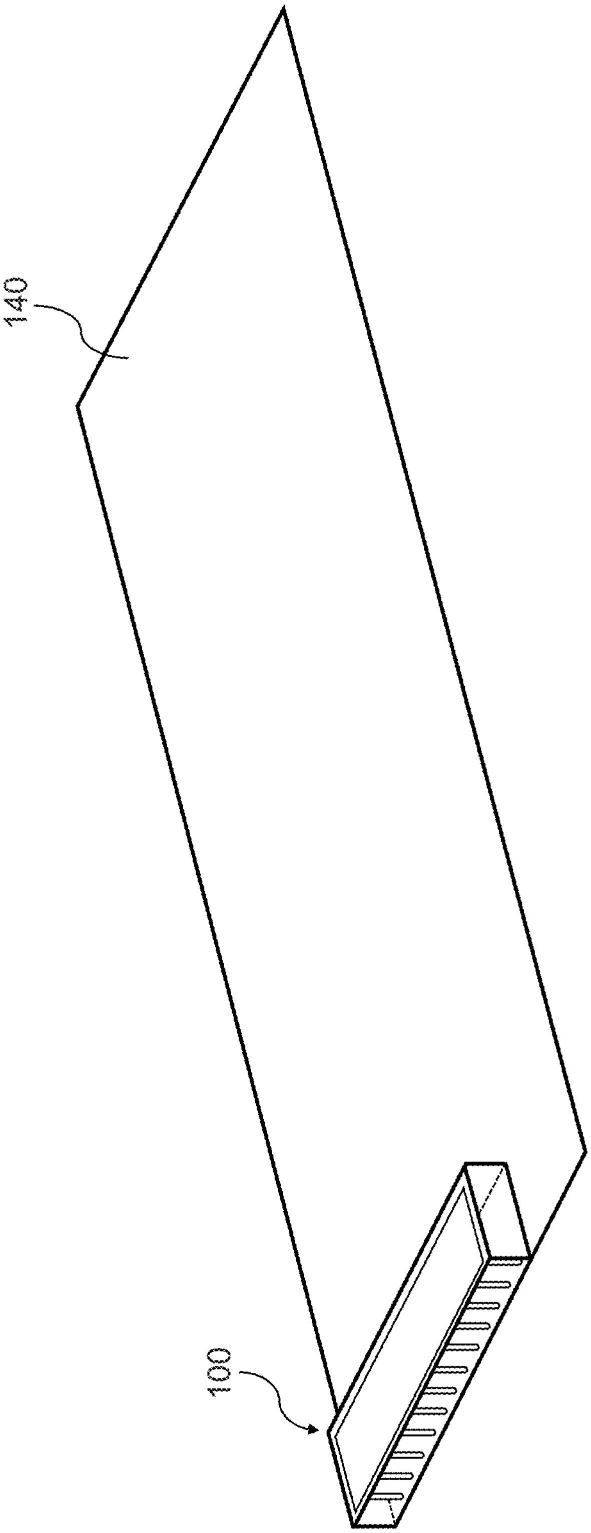
FIG. 2 depicts a perspective view of an example antenna assembly according to example embodiments of the present disclosure.

In some embodiments, antenna assembly 100 may further include circuit board 140 (e.g., printed circuit board). As shown in FIG. 2, circuit board 140 may be coupled to carrier 110 (e.g., second surface 114 of carrier 110).

Antenna assembly 100 further includes an antenna pattern 120. The specific antenna pattern 120 illustrated in FIG. 1 is provided for purposes of illustration and discussion. Those of ordinary skill in the art, using the disclosures provided herein will understand that other antenna patterns may be used without deviating from the scope of the present disclosure.

Antenna pattern 120 may include multiple portions. For example, antenna pattern 120 may include first portion 125 positioned at least partially on first surface 112 of carrier 110. In some embodiments, first portion 125 may be metal plated onto first surface 112 of carrier 110. In some embodiments, the first portion 125 may be an LDS defined antenna portion.

Antenna pattern 120 further includes a second portion 130 extending perpendicularly from the first portion 125 through ceramic carrier 110 to the second surface 114. As shown, the second portion 130 may be defined as a plurality of vias 131, 132, and 133 (e.g., plurality of conductive vias) extending through ceramic carrier 110 from first surface 112 to second surface 114. The plurality of vias 131, 132, 133 is configured such that antenna assembly 100 may achieve a desired radiation performance.

The plurality of vias 131, 132, 133 may be positioned along a carrier sidewall 116, 117, 118, 119 such that the plurality of vias 131, 132, 133 is parallel to the carrier sidewall 116, 117, 118, and 119. As shown in FIG. 1, the plurality of vias 131, 132, 133 may be positioned along carrier sidewall 116 such that each via of the plurality of vias 131, 132, 133 is located at a distance 135 from an edge of antenna pattern 120 (e.g., first portion 125 of antenna pattern 120). In some embodiments, distance 135 may be in a range from 0.2 mm to 0.3 mm, such as 0.25 mm. The plurality of vias 131, 132, 133 (e.g., second portion 130 of antenna pattern 120) may directly contact (e.g., be electrically coupled to) first portion 125 positioned on first surface 112 of carrier 110.

In some embodiments, the second portion 130 may electrically couple the first portion 125 to one or more portions 121, 122, and 123 positioned on second surface 114 of carrier 110. As such, second antenna portion 130 may include multiple pluralities of vias 131, 132, and 133. The multiple pluralities of vias 131, 132, and 133 may be configured to electrically couple first antenna portion 125 positioned on first surface 112 of carrier 110 to a plurality of antenna portions 121, 122, and 123 positioned on second surface 114 of carrier 110. For example, the plurality of vias 131 may electrically couple first portion 125 positioned on first surface 112 of carrier 110 to third portion 121 positioned on second surface 114 of carrier 110. The plurality of vias 132 may electrically couple first portion 125 positioned on first surface 112 of carrier 110 to fourth portion 122 positioned on second surface 114 of carrier 110. The plurality of vias 133 may electrically couple first portion 125 positioned on first surface 112 of carrier 110 to fifth portion 123 positioned on second surface 114 of carrier 110.

While three pluralities of vias 131, 132, and 133 and three antenna portions 121, 122, and 123 are depicted in FIG. 1, those skilled in the art will understand that second portion 130 may include any number of pluralities of vias electrically coupling first portion 125 to any number of portions positioned on second surface 114 of carrier 110 without deviating from the scope of the present disclosure.

Figure 3:
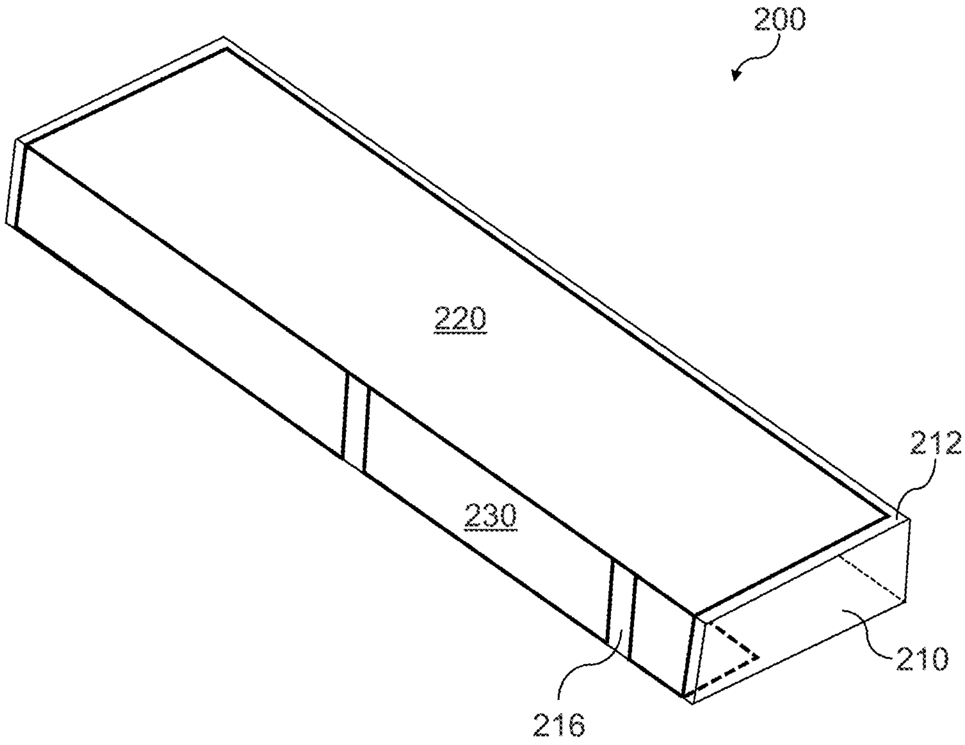
FIG. 3 depicts a perspective view of a vertical wall antenna assembly.

The second portion 130 (e.g., multiple pluralities of vias 131, 132, and 133) of antenna assembly 100 may be used to replace a vertical sidewall (e.g., metal sidewall). For example, FIG. 3 depicts a vertical sidewall antenna assembly 200. As shown in FIG. 3, the vertical sidewall antenna assembly 200 includes a first antenna pattern 220 positioned on a first surface 212 of the carrier 210. A vertical sidewall 230 (e.g., metal sidewall) is positioned on carrier sidewall 216 to achieve a desired radiation performance at a specified frequency band.

Production of vertical sidewall antenna assemblies 200 may be expensive due to vertical sidewall 230. Vias 131, 132, and 133 may be used instead of vertical sidewall 230 to achieve a similar desired radiation performance at a specified frequency band with a lower production cost.

Figure 4:
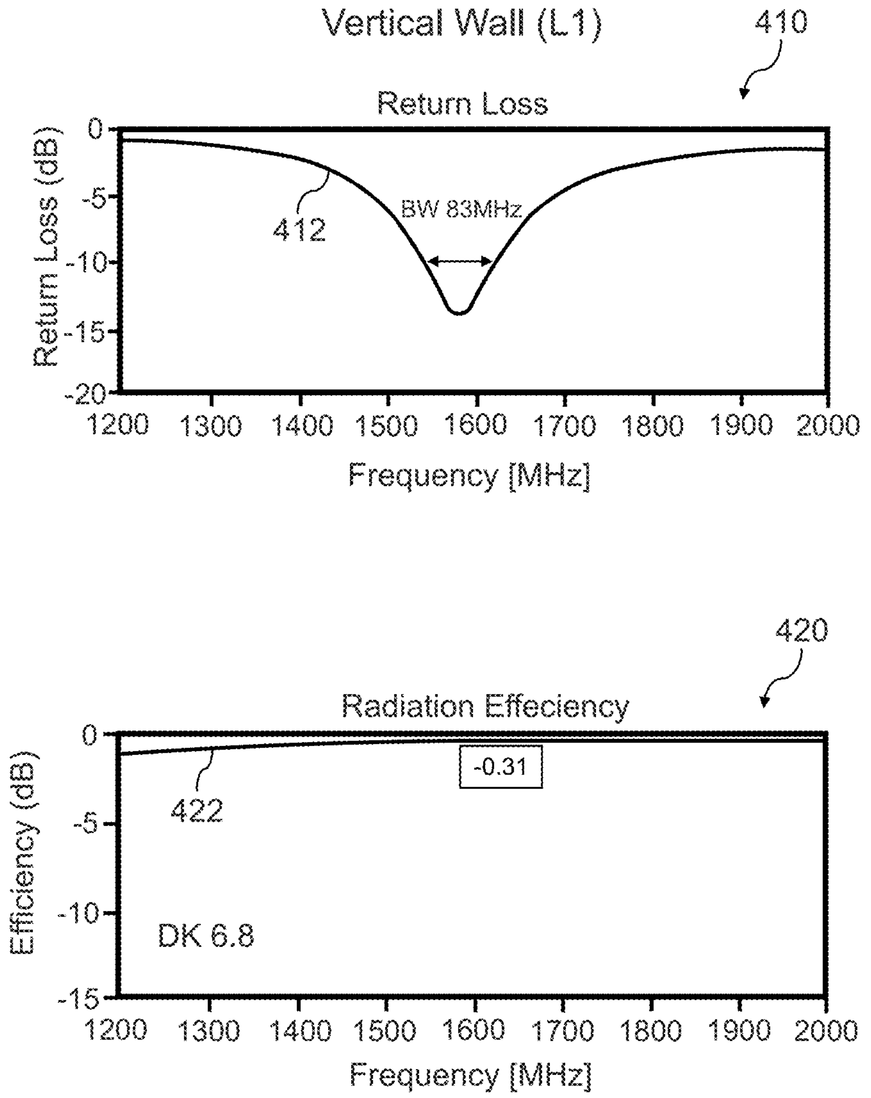
FIG. 4 depicts graphical representations of example return loss and example radiation efficiency of the vertical wall antenna assembly of FIG. 3 in the L1 frequency band.
Figure 5:
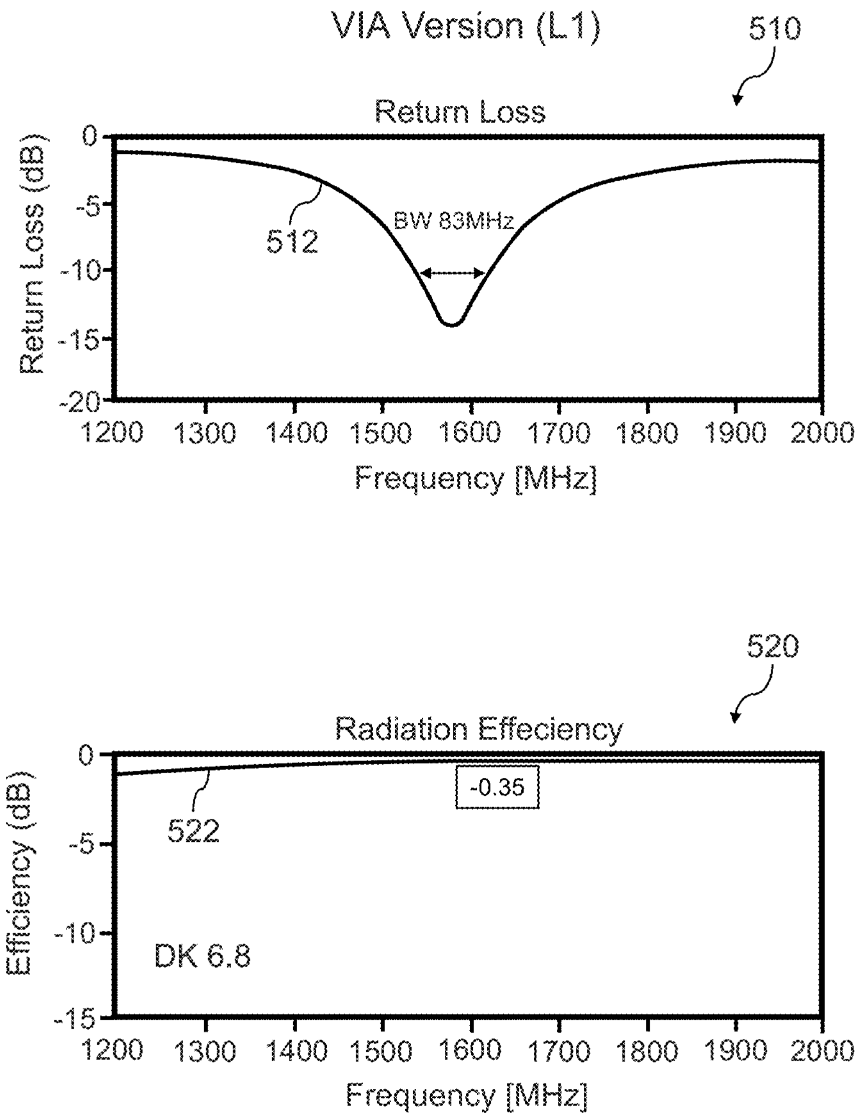
FIG. 5 depicts graphical representations of example return loss and example radiation efficiency of the antenna assembly according to example embodiments of the present disclosure in the L1 frequency band.

FIGS. 4-5 depict graphical representations of plots of example return loss and example radiation efficiency of antenna assembly 100 and vertical sidewall antenna assembly 200 in the L1 frequency band (e.g., GPS L1 band).

Specifically, FIG. 4 depicts plots of example return loss and example radiation efficiency of vertical sidewall antenna assembly 200 as shown in FIG. 3 in the L1 frequency band (e.g., GPS L1 band).

Plot 410 depicts an example return loss of vertical sidewall antenna assembly 200. As illustrated in plot 410 by curve 412, the vertical sidewall antenna assembly 200 may demonstrate a return loss of about −14 dB at a frequency of about 1575 MHz (e.g., GPS L1 operating frequency). As shown, vertical sidewall antenna assembly 200 may have a band width of 83 MHz. For example, vertical sidewall antenna assembly 200 may operate with a return loss of less than −10 dB in a frequency range of 83 MHz centered at 1575 MHz (e.g., GPS L1 operating frequency).

Further, plot 420 depicts an example radiation efficiency of vertical sidewall antenna assembly 200 in the L1 frequency band (e.g., GPS L1 band). As illustrated in plot 420 by curve 422, the vertical sidewall antenna assembly 200 may demonstrate an antenna radiation efficiency of about −0.31 dB at a frequency of about 1575 MHz (e.g., GPS L1 operating frequency).

FIG. 5 depicts plots of example return loss and example radiation efficiency of antenna assembly 100 in the L1 frequency band (e.g., GPS L1 band).

Plot 510 depicts an example return loss of antenna assembly 100. As illustrated in plot 510 by curve 512, antenna assembly 100 may demonstrate a return loss in a range of about −12 dB to about −16 dB, such as of about −14 dB at a frequency of about 1575 MHz (e.g., GPS L1 operating frequency). Antenna assembly 100 may have a bandwidth at a specific frequency based on the application of antenna assembly 100. In some embodiments, antenna assembly 100 may have a band width in a range of about 80 MHz to about 85 MHz, such as of about 83 MHz. For example, antenna assembly 100 may operate with a return loss of less than −10 dB in a frequency range of 83 MHz centered at 1575 MHz (e.g., GPS L1 operating frequency).

Further, plot 520 depicts an example radiation efficiency of antenna assembly 100 in the L1 frequency band (e.g., GPS L1 band). As illustrated in plot 520 by curve 522, antenna assembly 100 may demonstrate an antenna radiation efficiency in a range of about range of about −0.30 to about −0.40, such as about −0.35 dB at a frequency of about 1575 MHz (e.g., GPS L1 operating frequency).

As shown, antenna assembly 100 may achieve similar radiation performance metrics (e.g., return loss, band width, radiation efficiency) as vertical sidewall antenna assembly 200 in the L1 frequency band as shown in FIG. 4.

Figure 6:
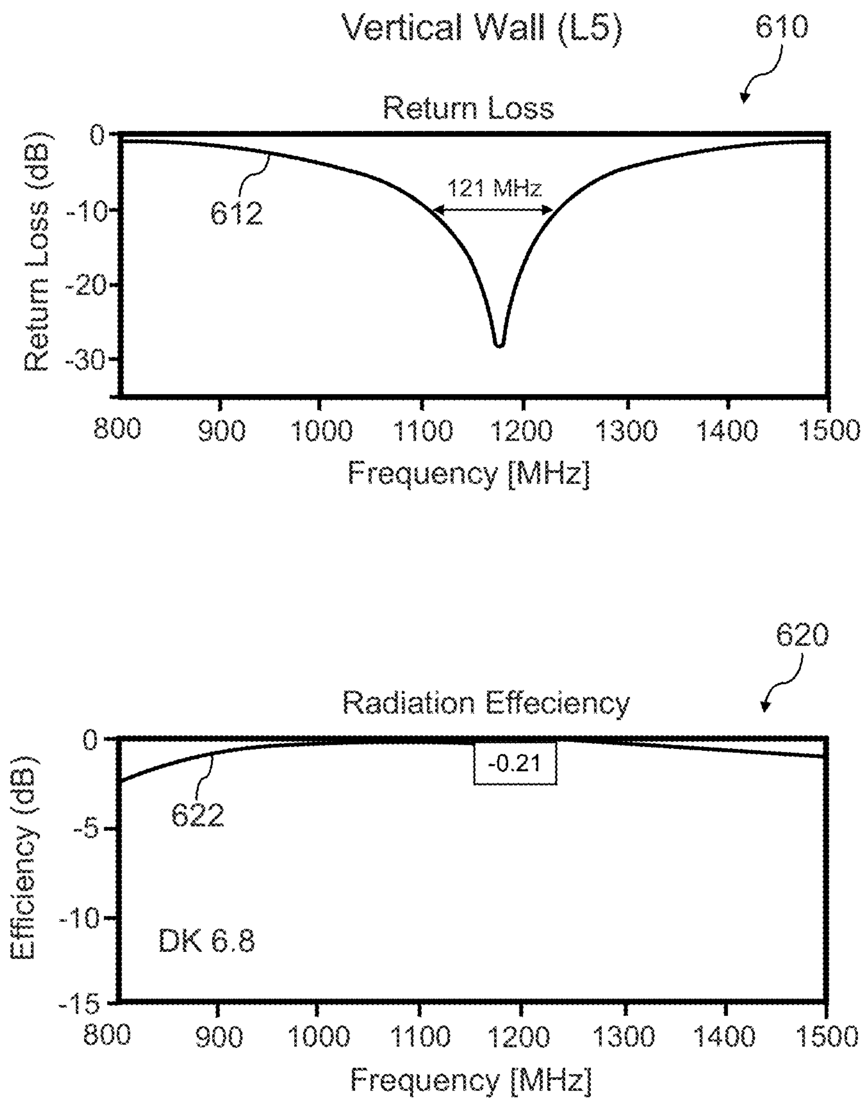
FIG. 6 depicts graphical representations of example return loss and example radiation efficiency of the vertical wall antenna assembly of FIG. 3 in the L5 frequency band.
Figure 7:
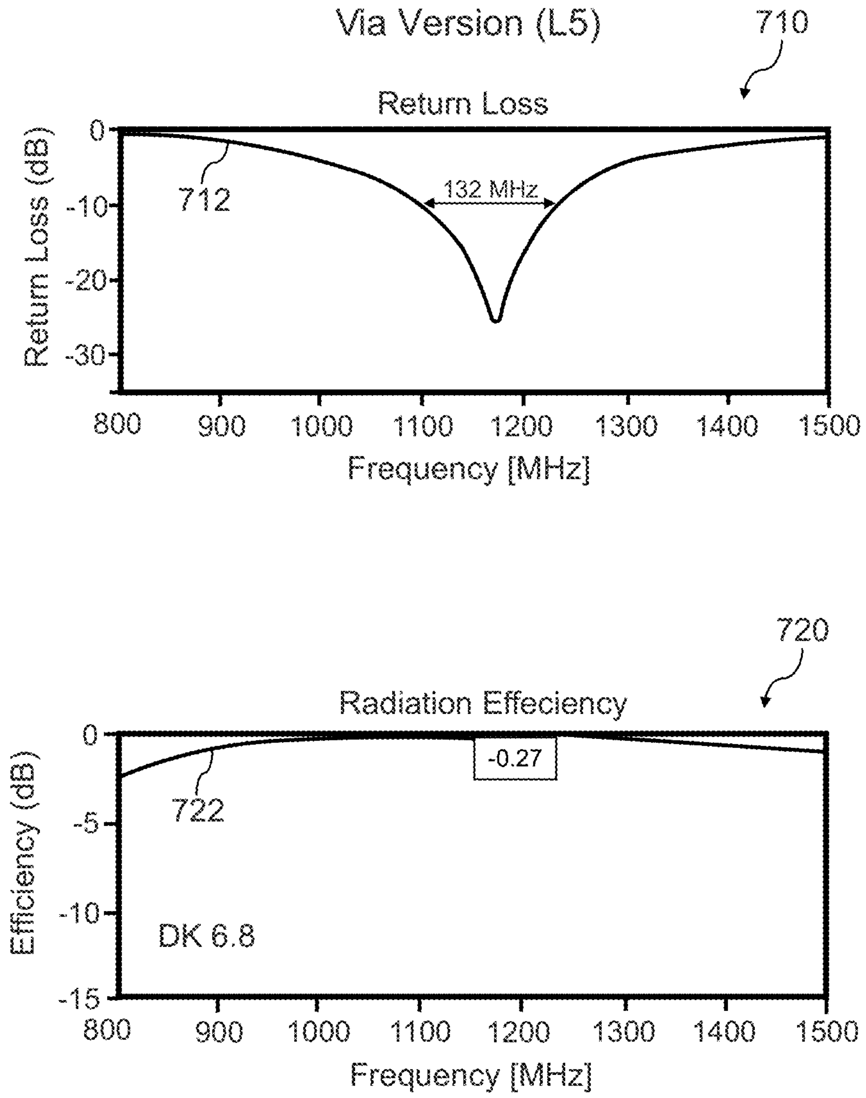
FIG. 7 depicts graphical representations of example return loss and example radiation efficiency of the antenna assembly according to example embodiments of the present disclosure in the L5 frequency band.

Further, FIGS. 6-7 depict graphical representations of plots of example return loss and example radiation efficiency of antenna assembly 100 and vertical sidewall antenna assembly 200 in the L5 frequency band (e.g., GPS L5 band).

Specifically, FIG. 6 depicts plots of example return loss and example radiation efficiency of vertical sidewall antenna assembly 200 as shown in FIG. 3 in the L5 frequency band (e.g., GPS L5 band).

Plot 610 depicts an example return loss of vertical sidewall antenna assembly 200. As illustrated in plot 610 by curve 612, the vertical sidewall antenna assembly 200 may demonstrate a return loss of about −28 dB at a frequency of about 1176 MHz (e.g., GPS L5 operating frequency). As shown, vertical sidewall antenna assembly 200 may have a band width of 121 MHz. For example, vertical sidewall antenna assembly 200 may operate with a return loss of less than −10 dB in a frequency range of 121 MHz centered at 1176 MHz (e.g., GPS L5 operating frequency).

Further, plot 620 depicts an example radiation efficiency of vertical sidewall antenna assembly 200 in the L5 frequency band (e.g., GPS L5 band). As illustrated in plot 620 by curve 622, the vertical sidewall antenna assembly 200 may demonstrate an antenna radiation efficiency of about −0.21 dB at a frequency of about 1176 MHz (e.g., GPS L5 operating frequency).

FIG. 7 depicts plots of example return loss and example radiation efficiency of antenna assembly 100 in the L5 frequency band (e.g., GPS L5 band).

Plot 710 depicts an example return loss of antenna assembly 100. As illustrated in plot 710 by curve 712, antenna assembly 100 may demonstrate a return loss in a range of about −25 dB to about −30 dB, such as about −26 dB at a frequency of about 1176 MHz (e.g., GPS L5 operating frequency). Antenna assembly 100 may have a bandwidth at a specific frequency based on the application of antenna assembly 100. In some embodiments, antenna assembly 100 may have a band width in a range of about 130 MHz to about 135 MHz, such as about 132 MHz. For example, antenna assembly 100 may operate with a return loss of less than −10 dB in a frequency range of 132 MHz centered at 1176 MHz (e.g., GPS L5 operating frequency).

Further, plot 720 depicts an example radiation efficiency of antenna assembly 100 in the L5 frequency band (e.g., GPS L5 band). As illustrated in plot 720 by curve 722, antenna assembly 100 may demonstrate an antenna radiation efficiency in a range of about −0.20 to about −0.30, such as about −0.27 dB at a frequency of about 1176 MHz (e.g., GPS L1 operating frequency).

As shown, antenna assembly 100 may achieve similar radiation performance metrics (e.g., return loss, band width, radiation efficiency) as vertical sidewall antenna assembly 200 in the L5 frequency band as shown in FIG. 6.

Figure 8:
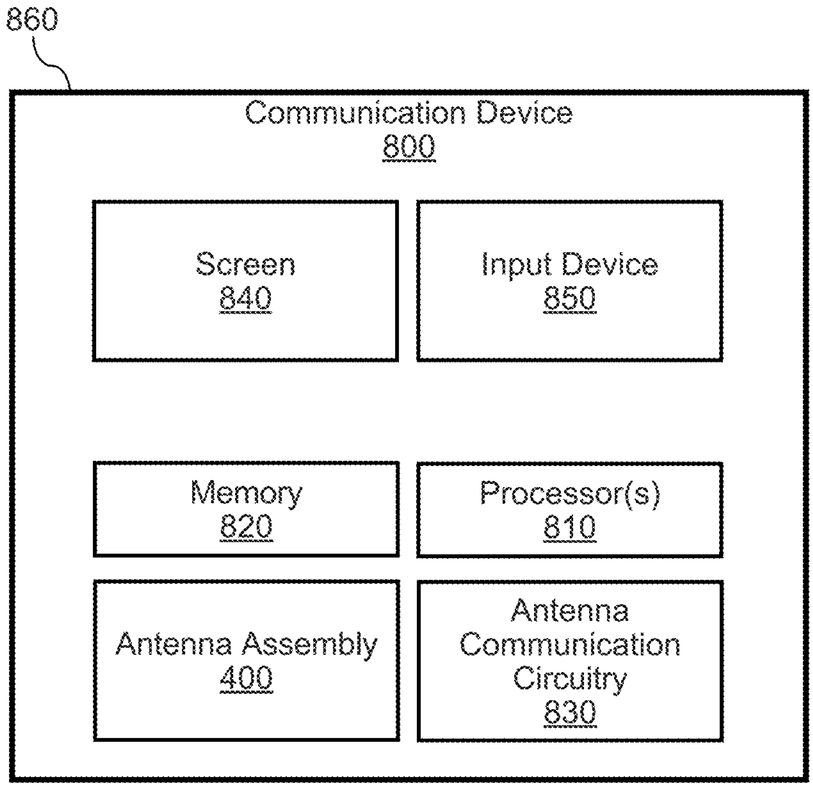
FIG. 8 depicts an example communication device according to example embodiments of the present disclosure.

FIG. 8 depicts an example communication device according to example embodiments of the present disclosure. As shown in FIG. 8, communication device 800 includes antenna assembly 400 (e.g., antenna). The antenna assembly 400 may be any of the antenna assemblies provided herein. Communication device 800 further includes communication circuitry 830. Communication circuitry 830 may include electrical components (e.g., transmission line, transceiver, receiver, transmitter, matching circuit etc.) configured to facilitate communication of information over the antenna. In some embodiments, communication device 800 includes memory 820 and one or more processor(s) 810. Processor(s) 810 are configured to perform a variety of computer implemented functions. As used herein, the term “processor” refers not only to integrated circuits referred to in the art as being included in a computer, but may also refer to a controller, microcontroller, a microcomputer, a programmable logic controller (PLC), an application specific integrated circuit (ASIC), a Field Programmable Gate Array (FPGA), and/or other programmable circuits. As shown, communication device 800 may include memory 820. Examples of memory 820 can include computer-readable media including, but not limited to, non-transitory computer-readable media, such as RAM, ROM, hard drives, flash drives, or other suitable memory devices. Memory 820 can store information accessible by the one or more processor(s) 810, including computer-readable instructions that can be executed by the one or more processor(s) 810.

Communication device 800 may further include a housing 860 configured to house components of communication device 800. In some embodiments, communication device 800 may further include one or more screen(s) 840 (e.g., display screen, touch screen). In some embodiments, communication device 800 may further include an input device 850 (e.g., key pad, touch pad, keyboard).

One example aspect of the present disclosure is directed to an antenna assembly. The antenna assembly includes a ceramic carrier having a first surface and a second surface, the second surface being opposite the first surface. The antenna assembly further includes an antenna pattern. The antenna pattern includes a first antenna portion positioned at least partially on the first surface of the ceramic carrier. The antenna pattern further includes a second antenna portion comprising a plurality of conductive vias extending through the ceramic carrier from the first antenna portion to the second surface of the ceramic carrier.

In some examples, the plurality of conductive vias is positioned along a sidewall of the ceramic carrier, each conductive via of the plurality of conductive vias being located a distance from the sidewall.

In some examples, the antenna pattern further includes a third antenna portion positioned on the second surface of the ceramic carrier. The second antenna portion electrically couples the first antenna portion to the third antenna portion.

In some examples, the antenna pattern further includes a fourth antenna portion positioned on the second surface of the ceramic carrier and a fifth antenna portion positioned on the second surface of the ceramic carrier. The second antenna portion electrically couples the first antenna portion to the fourth antenna portion. The second antenna portion electrically couples the first antenna portion to the fifth antenna portion.

In some examples, the antenna assembly comprises a GPS antenna.

In some examples, the GPS antenna operates at an L1 frequency band.

In some examples, the antenna assembly has a return loss in a range of about −12 dB to about −16 dB.

In some examples, the antenna assembly has a band width in a range of about 80 MHz to about 85 MHz.

In some examples, the antenna assembly has a radiation efficiency in a range of about −0.30 to about −0.40.

In some examples, the GPS antenna operates at an L5 frequency band.

In some examples, the antenna assembly has a return loss in a range of about −25 dB to about −30 dB.

In some examples, the antenna assembly has a band width in a range of about 130 MHz to about 135 MHz.

In some examples, the antenna assembly has a radiation efficiency in a range of about −0.20 to about −0.30.

In some examples, the antenna assembly further includes a circuit board. The circuit board is coupled to the second surface of the ceramic carrier.

In some examples, the plurality of conductive vias is located along a first sidewall of the ceramic carrier, the first sidewall being greater in length than adjacent sidewalls of the ceramic carrier.

In some examples, the antenna assembly does not include a metal sidewall.

Another example aspect of the present disclosure is directed to a communication device. The communication device includes an antenna. The antenna includes a first antenna portion positioned at least partially on a first surface of a ceramic carrier. The antenna further includes a second antenna portion comprising a plurality of conductive vias extending through the ceramic carrier from the first antenna portion to a second surface of the ceramic carrier. The second surface of the ceramic carrier is opposite the first surface of the ceramic carrier.

In some examples, the plurality of conductive vias is positioned along a sidewall of the ceramic carrier, each conductive via of the plurality of conductive vias being located a distance from the sidewall.

In some examples, the antenna further includes a third antenna portion positioned on the second surface of the ceramic carrier. The second antenna portion electrically couples the first antenna portion to the third antenna portion.

In some examples, the antenna further includes a fourth antenna portion positioned on the second surface of the ceramic carrier and a fifth antenna portion positioned on the second surface of the ceramic carrier. The second antenna portion electrically couples the first antenna portion to the fourth antenna portion. The second antenna portion electrically couples the first antenna portion to the fifth antenna portion.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna assembly, comprising:

a ceramic carrier having a first surface and a second surface, the second surface being opposite the first surface;

an antenna pattern, comprising:

a first antenna portion positioned at least partially on the first surface of the ceramic carrier; and a second antenna portion comprising a plurality of conductive vias extending through the ceramic carrier from the first antenna portion to the second surface of the ceramic carrier;

wherein the plurality of conductive vias is located along a first sidewall of the ceramic carrier, the first sidewall being greater in length than adjacent sidewalls of the ceramic carrier.

2. The antenna assembly of claim 1, wherein the plurality of conductive vias is positioned along a sidewall of the ceramic carrier, each conductive via of the plurality of conductive vias being located a distance from the sidewall.

3. The antenna assembly of claim 1, wherein the antenna pattern further comprises:

a third antenna portion positioned on the second surface of the ceramic carrier, wherein the second antenna portion electrically couples the first antenna portion to the third antenna portion.

4. The antenna assembly of claim 1, wherein the antenna pattern further comprises:

a fourth antenna portion positioned on the second surface of the ceramic carrier; and a fifth antenna portion positioned on the second surface of the ceramic carrier, wherein the second antenna portion electrically couples the first antenna portion to the fourth antenna portion, wherein the second antenna portion electrically couples the first antenna portion to the fifth antenna portion.

5. The antenna assembly of claim 1, wherein the antenna assembly comprises a GPS antenna.

6. The antenna assembly of claim 5, wherein the GPS antenna operates at an L1 frequency band.

7. The antenna assembly of claim 6, wherein the antenna assembly has a return loss in a range of about −12 dB to about −16 dB.

8. The antenna assembly of claim 6, wherein the antenna assembly has a band width in a range of about 80 MHz to about 85 MHz.

9. The antenna assembly of claim 6, wherein the antenna assembly has a radiation efficiency in a range of about −0.30 to about −0.40.

10. The antenna assembly of claim 5, wherein the GPS antenna operates at an L5 frequency band.

11. The antenna assembly of claim 10, wherein the antenna assembly has a return loss in a range of about −25 dB to about −30 dB.

12. The antenna assembly of claim 10, wherein the antenna assembly has a band width in a range of about 130 MHz to about 135 MHz.

13. The antenna assembly of claim 10, wherein the antenna assembly has a radiation efficiency in a range of about −0.20 to about −0.30.

14. The antenna assembly of claim 1, further comprising:

a circuit board, wherein the circuit board is coupled to the second surface of the ceramic carrier.

15. The antenna assembly of claim 1, wherein the antenna assembly does not include a metal sidewall.

16. A communication device, comprising:

an antenna, comprising:

a first antenna portion positioned at least partially on a first surface of a ceramic carrier; and a second antenna portion comprising a plurality of conductive vias extending through the ceramic carrier from the first antenna portion to a second surface of the ceramic carrier, wherein the second surface of the ceramic carrier is opposite the first surface of the ceramic carrier and the plurality of conductive vias is located along a first sidewall of the ceramic carrier, the first sidewall being greater in length than adjacent sidewalls of the ceramic carrier.

17. The communication device of claim 16, wherein the plurality of conductive vias is positioned along a sidewall of the ceramic carrier, each conductive via of the plurality of conductive vias being located a distance from the sidewall.

18. The communication device of claim 16, wherein the antenna further comprises:

a third antenna portion positioned on the second surface of the ceramic carrier, wherein the second antenna portion electrically couples the first antenna portion to the third antenna portion.

19. The communication device of claim 16, wherein the antenna further comprises:

a fourth antenna portion positioned on the second surface of the ceramic carrier; and a fifth antenna portion positioned on the second surface of the ceramic carrier, wherein the second antenna portion electrically couples the first antenna portion to the fourth antenna portion, wherein the second antenna portion electrically couples the first antenna portion to the fifth antenna portion.

* * * * *